United States Patent
Mardinian

(10) Patent No.: US 7,616,683 B2
(45) Date of Patent: *Nov. 10, 2009

(54) AUTOMATIC SWITCHING BETWEEN DSL AND ANALOG ON A SINGLE RJ-11 DSL/ANALOG COMBO MODEM

(75) Inventor: Olivier Mardinian, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/363,061

(22) Filed: Feb. 28, 2006

(65) Prior Publication Data

US 2006/0146923 A1 Jul. 6, 2006

Related U.S. Application Data

(62) Division of application No. 09/792,946, filed on Feb. 26, 2001, now Pat. No. 7,006,559.

(51) Int. Cl.
*H04B 1/38* (2006.01)
*H04L 5/16* (2006.01)

(52) U.S. Cl. .................. 375/222; 379/93.01; 379/93.05; 455/557

(58) Field of Classification Search .............. 379/93.01, 379/93.05; 455/557; 375/222
See application file for complete search history.

(56) References Cited

U.S. PATENT DOCUMENTS

| | | | |
|---|---|---|---|
| 5,479,480 | A | 12/1995 | Scott |
| 6,101,216 | A | 8/2000 | Henderson et al. |
| 6,345,071 | B1 | 2/2002 | Hamdi |
| 6,442,248 | B1 | 8/2002 | Davis |
| 6,563,864 | B1 | 5/2003 | Ibrahim et al. |
| 6,643,364 | B1 | 11/2003 | Takahashi |
| 6,700,956 | B2 | 3/2004 | Chang et al. |
| 6,868,502 | B2 | 3/2005 | Wei et al. |
| 7,016,402 | B2 * | 3/2006 | Sherlock ..................... 375/222 |

* cited by examiner

*Primary Examiner*—Ted Wang
(74) *Attorney, Agent, or Firm*—Buchanan Ingersoll & Rooney PC

(57) ABSTRACT

A modem for providing both DSL and analog signal connection capability with a single RJ-11 jack via an automatic switching mechanism. The switching mechanism is controlled by software, which is responsive to user connection preference (i.e., for DSL or analog connection) and/or the detection that a DSL service is available. Dependent on whether DSL is detected on the signal line coupled to the jack and/or whether the user selects a DSL connection, the switching mechanism routes the signal received on the RJ-11 jack through either a path having the DSL modem circuitry or a path having analog modem circuitry.

10 Claims, 2 Drawing Sheets

AUTOMATIC SWITCHING BETWEEN DSL AND ANALOG ON A SINGLE RJ-11 DSL/ANALOG COMBO MODEM

This application is a divisional of application Ser. No. 09/792,946, filed Feb. 26, 2001 now U.S. Pat. No. 7,006,559.

BACKGROUND OF THE INVENTION

1. Field of the Invention

The present invention relates generally to telecommunications devices and more particularly to the use of modems in DSL and analog environments.

2. Background Information

Standard analog modems (modulator-demodulator devices) are currently commonplace in the home and office environments, where they are used to enable electronic devices, such as personal computers, to transmit data over existing telephone lines (made of small gauge copper wire) to other electronic devices. Data is stored digitally in such devices, but is converted by an analog modem to be transmitted over the lines in analog form. A data stream is established between a sender (i.e., originating electronic device) and a receiver (i.e., receiving electronic device) by using the resources of an entire telecommunications system. In other words, data is transmitted from the sender's local loop, through the a telephone switching system, and to the receiver's local loop. Because the lines used by analog modems to transmit data only use a frequency range of about 0-3400 Hz, a data transmittance limit of about 56,000 bits-per-second (bps) exists for communication through the lines. An analog modem operating at this high end may, for example, be a modem operating under the ITU V.90 standard.

An emerging technology called Digital Subscriber Line (DSL) offers users data transmittance speeds much higher than those offered by standard modem systems. Unlike the switching systems associated with analog communications, modems that support DSL must be physically connected at one end of a telephone line (i.e., copper wire) to a phone company central office at the other end of the line, which is typically no longer than 18,000 feet. However, by using a much greater bandwidth (from 60 KHz to 1 MHz), DSL allows higher transfer rates, but is limited to about 18,000 feet in reach. Currently, DSL modems are capable of transmitting data from around 8.128 Mbps to 512 Kbps (downstream) and 128 Kbps to 800 Kbps (upstream).

In addition, because DSL technology uses a different area of the spectrum than regular telephony, it is possible to have simultaneous voice and data use of a single copper connection. One example of communications technology that provides this is called Asymmetric DSL (ADSL). In other words, the "lower" range of frequencies (i.e., up to 3400 Hz) is used for the transmittance of voice data, while the "higher" range is used by a DSL modem to transmit digital data. In this way, a DSL connection is always "on" and separate from any voice data transmissions. However, many phones may pass onto the copper frequencies higher than 3400 kHz and allow voice data to interfere with a DSL data stream. Conversely, the higher frequencies used by a DSL modem may be picked up by a phone, which will cause static in the voice data stream.

Two methods currently exist for countering these problems. The first one creates a "spluttered" environment, where devices called "splitters" are attached to phone lines in close proximity to the home or office where data is to be received. As shown in the FIG. 2 example, a nixed-signal S(1) is received by a splitter 205 from center 201, which may be, for example, a phone company central office. The mixed-signal S(1) includes both analog and DSL data and is spectrally separated by splitter 205 into analog signal S(2) and DSL signal S(3). Phone 202 receives analog signal S(2) through wall jack 206 and DSL modem 203 receives DSL signal S(3) through wall jack 207. Data from DSL signal S(3) is then processed and sent by DSL modem 203 to a processor 204, where information may be presented to a user (e.g., via an Internet browser). Splitter 205 also acts as a low pass filter, allowing only voice data frequencies (i.e., 0-3400 Hz) to be transmitted to and from the phone, thereby eliminating any interference between a phone and a DSL modem.

The second method creates a "splitterless" environment, where lower frequency data (i.e., analog voice) is not separated or "split" from the higher frequency data (i.e., digital DSL) before being received from a wall jack. As shown in the FIG. 3 example, center 301 transmits a mixed-signal S(4), which is received by microfilter 305 and DSL/analog combo modem 303 through wall jacks 306 and 307, respectively. In such an environment, the installation of a separate splitter (e.g., splitter 205 in FIG. 2) is avoided. Instead, a customer-installable microfilter 305 is used to eliminate interference between voice and data frequencies. Combo modem 303 is a modem which is capable of supporting both DSL and analog transmission. Thus, processor 304 is able to receive converted DSL data and analog data from combo modem 303.

As DSL is a new technology, DSL/Analog combo modems, such as combo modem 303, are not yet widely available. Those that are available are equipped with two RJ-11 jacks: one for connection to a DSL outlet and the other to an analog outlet. In the interest of cost and space reduction, it would be preferable to have such a combo modem with only a single RJ-11 jack; however, such a configuration, without further alteration, would not be able to receive both DSL and analog signals.

SUMMARY OF THE INVENTION

The present invention is directed to a modem that provides both DSL and analog signal connection capability with a single jack.

According to a first embodiment of the present invention, a modem is provided to support both DSL and analog signal connection capability, comprising a first circuitry, a second circuitry, an input jack for receiving a signal, a detector for detecting whether the received signal is of a first or second type, and a switching mechanism, wherein the switching mechanism selectively couples the input jack to the first or second circuitry based on the detected signal type, further wherein a user is able to uncouple the input jack from the second circuitry and to couple the input jack to the first circuitry.

According to a second embodiment of the present invention, a system is provided for switching, comprising means for receiving a signal, means for detecting whether the received signal is of a first or second type, means for selectively coupling the means for receiving to a first circuitry if the received signal is of a first type, or to a second circuitry if the received signal is of a second type, and means for allowing a user to uncouple the means for receiving from the second circuitry and to couple the means for receiving to the first circuitry.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

Figure 1:
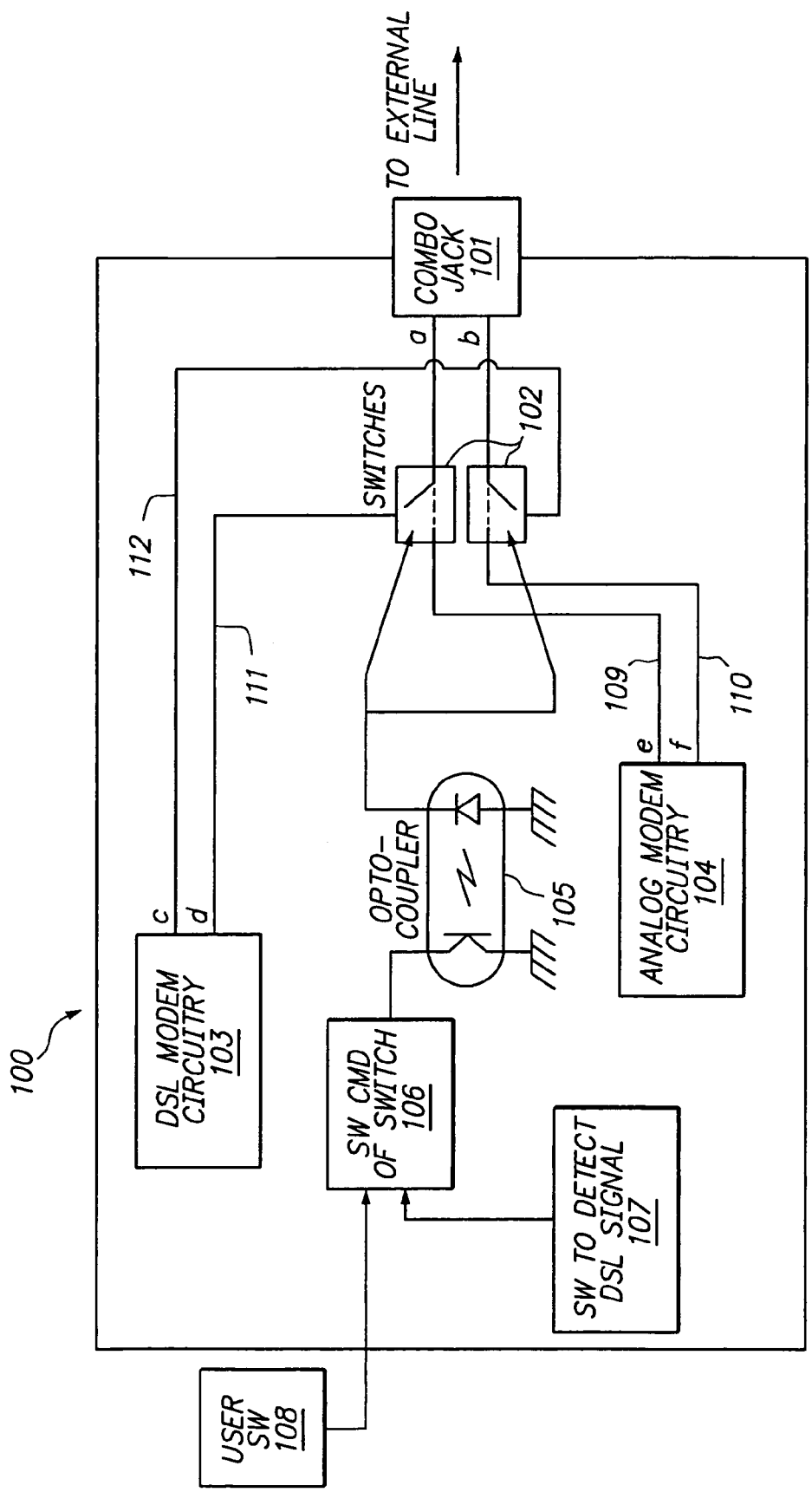
FIG. 1 illustrates a combo modem in accordance with an embodiment of the present invention.
Figure 2:
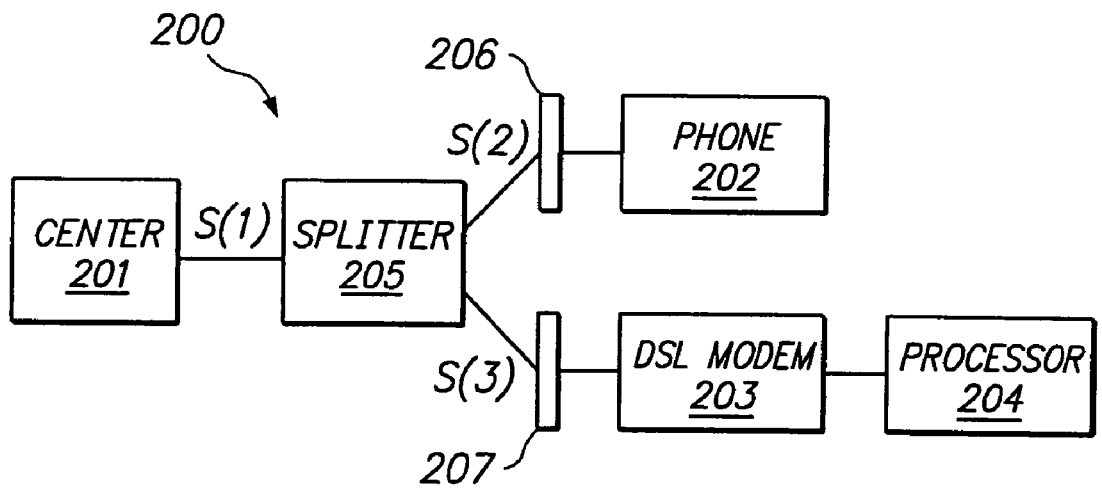
FIG. 2 illustrates a DSL/analog spluttered environment.
Figure 3:
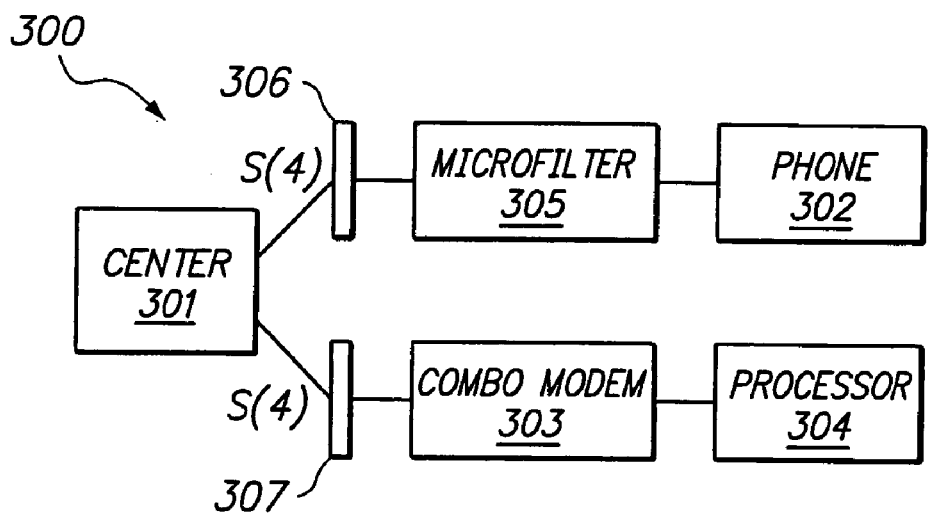
FIG. 3 illustrates a DSL/analog splitterless environment.

Combo modem 100, as shown in FIG. 1, includes a combo jack 101, a set of switches 102, DSL modem circuitry 103, and analog modem circuitry 104. Combo jack 101 is preferably a RJ-11 jack and digital modem circuitry 103 is preferably circuitry operable to process DSL signals.

Command signals from software modules 107 and 108 are transmitted to command module 106, and these signals are transmitted to switches 102 through opto-coupler 105. Opto-coupler 105 also acts to isolate the command signal path of software 106 from switches 102 by severing the connection between them. It will be appreciated that alternatively, signal isolation can be implemented at switches 102, which can accordingly be optical switches, for instance. Switches 102 are connected to terminals (a) and (b) of combo jack 101, which are commonly termed the TIP and RING lines of the circuit, and the received command signals from software 106 are able to switch both lines using switches 102.

Software 106 transmits command signals to switches 102 based on user preference and/or detected signal type. In the case of user preference, a user instructs software 108 (e.g., through a user-computer interface device) that combo modem 100 should be either set in a DSL mode or an analog mode. To do this, software 106 sends command signals to switches 102 via module 106, which internally connect combo jack 101 to DSL modem circuitry 103 if a digital mode is desired, or to analog modem circuitry 104 if an analog mode is desired. To connect combo jack 101 to DSL modem circuitry 103, switches 102 are commanded to connect terminals (a) and (b) of combo jack 101 with terminals (d) and (c) of DSL modem circuitry 103 through connection paths 111 and 112, respectively. This switching configuration is shown by the solid-line representation of switches 102 in the figure. To connect combo jack 101 to analog modem circuitry 104, switches 102 are commanded to connect terminals (a) and (b) of combo jack 101 with terminals (e) and (f) of analog modem circuitry 104 through connection paths 109 and 110, respectively. This configuration is shown by the dotted-line representation of switches 102 in the figure. Switches 102 can be for instance standard CMOS switches, mechanical relays, or opto-coupler switches as mentioned above.

Software 107 may be provided in order to automatically detect whether a signal line connected to combo jack 101 carries DSL frequencies, which may indicate that DSL service is available. One method for implementing automatic detection is to configure the combo modem 100 to enter DSL mode at power up, as a default condition. If a DSL signal is not detected after a certain period of time, the switch to analog mode is effected. Specifically, the combo modem tries to establish a DSL connection, and if it is unable, then it switches to analog mode. When DSL signals are not detected by software 106 on the line connected to the external side of combo jack 101, software 106 automatically instructs switches 102 to connect combo jack 101 to analog modem circuitry 104 by switches 102. When DSL signals are detected on the connected line, which may occur either in a splittered or splitterless environment, combo jack 101 is by default connected to DSL modem circuitry 103. In a splitterless environment, where the connected line also carries analog frequencies, a user may want to use the analog capability of combo modem 100 (e.g., to send a facsimile message) and to "override" the initial switching instructed by software 106. In this case, the user can instruct software 106 to disconnect combo jack 101 from DSL modem circuitry 103 and switch the connection to analog modem circuitry 104.

In this way, a DSL/analog combo modem with a single RJ-11 jack is able to switch its circuitry between a digital DSL connection and an analog connection, based on user preference and/or detected signal type.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A modem, comprising:
   a first modem circuit and a second modem circuit;
   an input jack for receiving a signal;
   a detector that detects whether a signal received at said jack is of a first type containing only analog data, or a second type containing DSL data; and
   a switching mechanism that selectively couples the input jack to the first modem circuit and disconnects the input jack from the second modem circuit, when the received signal is detected to be of said first type, and couples the input jack to the second modem circuit and disconnects the input jack from the first modem circuit, when the received signal is detected to be of said second type.

2. The modem of claim 1, wherein the signal of the second type also contains analog data.

3. The modem of claim 1, wherein the first circuitry is analog modem circuitry and the second circuitry is DSL, modem circuitry.

4. A switching system, comprising:
   an input jack;
   a detector that determines whether a signal received at said jack is of a first type containing only analog data, or a second type containing DSL data; and
   a switching circuit that selectively couples the input jack to a first modem circuit and disconnects the input jack from a second modem circuit when the received signal is of said first type, and couples the input jack to the second modem circuit and disconnects the input jack from the first modem circuit when the received signal is of said second type.

5. The system of claim 4, wherein said input jack is an RJ-11 jack.

6. The system of claim 4, wherein the signal of the second type also contains analog data.

7. The system of claim 4, wherein the first circuitry is analog modem circuitry and the second circuitry is DSL modem circuitry.

8. A method of providing DSL and analog signal capability with a single input jack comprising:
   receiving a signal at the input jack;
   detecting whether the signal received at the input jack is of a first type containing only analog data, or a second type containing DSL data;
   selectively coupling the input jack to a first modem circuit and disconnecting the input jack from a second modem circuit, when the received signal is detected to be of said first type, and selectively coupling the input jack to the second modem circuit and disconnecting the input jack from the first modem circuit, when the received signal Is detected to be of said second type.

9. The method of claim 8, where the signal of the second type also contains analog data.

10. The method of aim 8, wherein the first modem circuit is analog modem circuitry and the second modem circuit is DSL modem circuitry.

* * * * *

UNITED STATES PATENT AND TRADEMARK OFFICE
CERTIFICATE OF CORRECTION

PATENT NO. : 7,616,683 B2 Page 1 of 1
APPLICATION NO. : 11/363061
DATED : November 10, 2009
INVENTOR(S) : Olivier Mardinian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Nineteenth Day of October, 2010

David J. Kappos
*Director of the United States Patent and Trademark Office*